(No Model.)
R. PARKER.
SYRINGE.
No. 341,855.
Patented May 11, 1886.
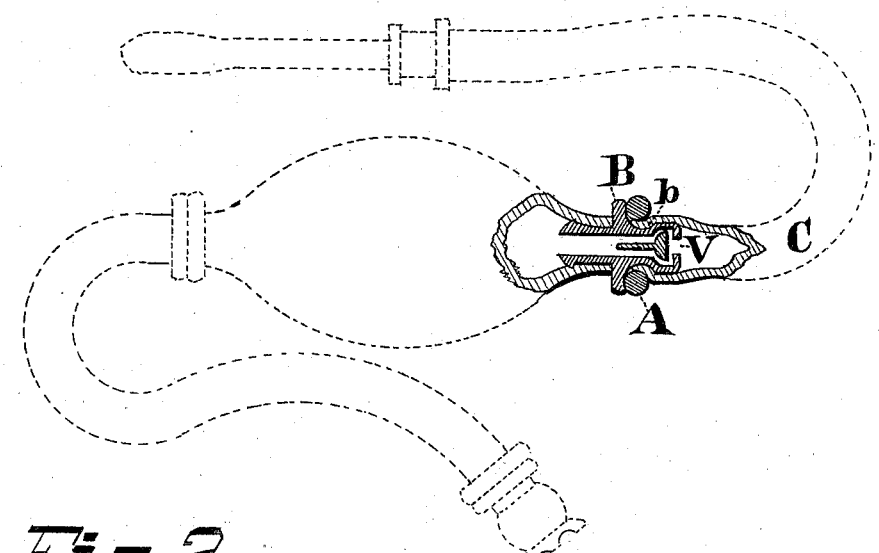
Witnesses.
W. A. Taylor.
John W. Lindsay
Inventor.
Russell Parker

UNITED STATES PATENT OFFICE.

RUSSELL PARKER, OF BROOKLYN, NEW YORK.

SYRINGE.

SPECIFICATION forming part of Letters Patent No. 341,855, dated May 11, 1886.

Application filed April 1, 1886. Serial No. 197,482. (No model.)

*To all whom it may concern:*

Be it known that I, RUSSELL PARKER, of the city of Brooklyn, county of Kings, State of New York, have invented a new and useful Improvement in Syringes, of which the following is a full and exact description, reference being had to the accompanying drawings, forming part of this specification.

My invention relates to an improved means of coupling the ordinary valved connections of a syringe with the flexible tubes thereof.

Heretofore the flexible tubes on syringes have been attached to the valved ends of couplings, made in one piece, by tightly springing the tube over the valve-chamber. It has therefore been necessary to construct the valved end of the coupling much larger than the bore of the flexible tube, to insure an air-tight joint when the flexible tube embraces the coupling. The valves of syringes so constructed are difficult of access, and when the flexible tubes are disconnected from couplings of this kind for the purpose of cleaning the valves the tubes can only be replaced with great difficulty, and the syringe is liable to leak at this point.

The object of my invention is to provide a simple means of binding the flexible tube to the valved coupling, and at the same time provide for a ready access to the valve for the purpose of cleaning it.

In the accompanying drawings, forming a part of this specification, similar letters represent corresponding parts.

Figure 1 is a view in part outline and part longitudinal section, showing a syringe provided with an ordinary rigid coupling, B, made in one piece, and having the valved end V embraced by the flexible tube C and the elastic band or ring A. Fig. 2 is a perspective view of the ring A, which is preferably made round in cross-section, as shown in Fig. 1.

In my invention I construct the coupling B with an annular groove, *b*, and when the flexible tube C is slipped over the valved end of the coupling the elastic ring A is sprung over the end of the tube, forcing it tightly into the groove *b* and securely holding it into place.

When it is required to gain access to the valve, the elastic ring A is simply sprung or rolled back over the shoulder of the coupling unto the bulb-neck and the tube C easily removed and replaced, when the ring is again sprung or rolled back in place, as shown in Fig. 1.

The tube C is preferably made to loosely embrace the coupling B, so as to be easily removed when the ring A is rolled back upon the bulb-neck.

Having thus described my invention, what I claim as new, and desire to secure by Letters Patent, is—

The valved coupling B, having an annular groove, *b*, embraced by a flexible tube, C, said tube being held in place by the elastic ring A, substantially as described.

RUSSELL PARKER.

Witnesses:
EDMOND A. WARREN,
FREDERIC G. LITTELL.